(12) United States Patent
Moskovitch et al.

(10) Patent No.: US 8,490,194 B2
(45) Date of Patent: Jul. 16, 2013

(54) METHOD AND SYSTEM FOR DETECTING MALICIOUS BEHAVIORAL PATTERNS IN A COMPUTER, USING MACHINE LEARNING

(76) Inventors: Robert Moskovitch, Ashkelon (IL); Dima Stopel, Beer Sheva (IL); Zvi Boger, Beer Sheva (IL); Yuval Shahar, Omer (IL); Yuval Elovici, Moshav Arugot (IL)

( * ) Notice: Subject to any disclaimer, the term of this patent is extended or adjusted under 35 U.S.C. 154(b) by 1138 days.

(21) Appl. No.: 11/699,124

(22) Filed: Jan. 29, 2007

(65) Prior Publication Data

US 2007/0294768 A1 Dec. 20, 2007

(30) Foreign Application Priority Data

Jan. 31, 2006 (IL) .......................................... 173473
Jun. 15, 2006 (IL) .......................................... 176347
Jan. 29, 2007 (IL) .......................................... 181041

(51) Int. Cl.
*G06F 11/00* (2006.01)

(52) U.S. Cl.
USPC ........................................................ 726/24

(58) Field of Classification Search
USPC ........................................................ 726/24
See application file for complete search history.

(56) References Cited

U.S. PATENT DOCUMENTS

| 5,121,467 | A | * | 6/1992 | Skeirik .......................... 706/10 |
| 5,376,962 | A | * | 12/1994 | Zortea ........................ 348/222.1 |
| 5,907,834 | A | * | 5/1999 | Kephart et al. ................ 706/20 |
| 2002/0133721 | A1 | * | 9/2002 | Adjaoute ..................... 713/201 |
| 2003/0065926 | A1 | | 4/2003 | Schultz et al. |
| 2004/0199791 | A1 | * | 10/2004 | Poletto et al. ................ 713/201 |

FOREIGN PATENT DOCUMENTS

WO WO 01/31421 5/2001

OTHER PUBLICATIONS

Kabiri and Ghorbani, International Journal of Network Security, vol. 1, No. 2, pp. 84-102, Sep. 2005.
Domingos P. and Pazzani M, Machine Learning, 29:103-130, 1997.
Pearl J., 1986, Fusion, propagation, and structuring in belief networks, Artificial Intelligence, 29(3):241-288.
Zvi Boger, "Selection of Quasi-Optimal Inputs in Chemometrics Modeling by Artificial Neural Network Analysis" Analytica Chimica Acta 490, Mar. 2003, pp. 31-40.
Demuth H. and Beale, 1998, M. Neural Network Toolbox for use with Matlab, The Mathworks Inc., Natick, MA, USA.
Lorch, J. and Smith, A. J. (2000) The VTrace tool: building a system tracer for Windows NT and Windows 2000. MSDN Magazine, 15(10):86-102, Oct. 2000.
Kabiri and Ghorbani, "Research on Intrusion Detection and Response: A Survey", International Journal of Network Security, vol. 1, No. 2, pp. 84-102, Sep. 2005.
Decision Trees at http://en.wikipedia.org/wiki/Decision_tree, Jan. 22, 2007.
Naive Bayes methods at http://en.wikipedia.org/wiki/Naive_bayes, Dec. 22, 2006.
Bayesian networks at http://en.wikipedia.org/wiki/Bayesian_networks, Jan. 18, 2007.

* cited by examiner

*Primary Examiner* — Cordelia Zecher
(74) *Attorney, Agent, or Firm* — Roach Brown McCarthy & Gruber P.C; Kevin D. McCarthy (57) ABSTRACT

Method for detecting malicious behavioral patterns which are related to malicious software such as a computer worm in computerized systems that include data exchange channels with other systems over a data network. Accordingly, hardware and/or software parameters are determined in the computerized system that is can characterize known behavioral patterns thereof. Known malicious code samples are learned by a machine learning process, such as decision trees and artificial neural networks, and the results of the machine learning process are analyzed in respect to the behavioral patterns of the computerized system. Then known and unknown malicious code samples are identified according to the results of the machine learning process.

2 Claims, 4 Drawing Sheets

METHOD AND SYSTEM FOR DETECTING MALICIOUS BEHAVIORAL PATTERNS IN A COMPUTER, USING MACHINE LEARNING

FIELD OF THE INVENTION

The present invention relates to the field of computer protection. Specifically, this invention relates to the use of machine learning methods for detecting malicious behavioral patterns in computerized systems that comprise data exchange channels, e.g. personal computers and servers, which are related to malicious software.

BACKGROUND OF THE INVENTION

During recent years, the number of attacks on computer networks has increased dramatically, as has the dependence of companies and government agencies on their computer networks. Consequently, many efforts have been made in order to provide computer protection.

A single malware (malicious software) in a computerized system, intruding the system from the computer network, can result in the loss and/or unauthorized utilization and/or modification of large amounts of data. One of the most malicious types of software is the computer worm. A computer worm is a self-replicating computer program, similar to a computer virus, which is often designed to propagate by exploiting the data transmission capabilities which are an inherent feature in almost any computer. The main difference between a computer virus and a worm is that a virus cannot propagate by itself, whereas worms can. A worm uses a data network to send copies of itself to other systems without any intervention.

One of the most difficult tasks of a network administrator is to treat a network that has been congested by a new internet worm spreading itself from thousands of client machines. It is often impossible to remotely remove a worm, or to provide worm removal instructions to an inexperienced user. One of the conventional solutions is to operate a virus scanner on a dedicated machine and to analyze all traffic from/to clients. One of the major disadvantages of virus scanners is that they depend on signatures, which in most cases cannot generalize. That is, virus scanners generally are able to detect only malwares whose signatures exist in the database of the virus scanner.

The first step of dealing with computer worms is the identification of their intrusion into the system. A recent review by Kabiri and Ghorbani (the International Journal of Network Security, Vol. 1, No. 2, pages 84-102), describes two major approaches for detecting intrusions in computer systems. The first approach is signature based and the second is anomaly based.

Signature based methods compare any incoming data with known behaviors of malware and determine intrusions once a match has been made. Such a system will therefore be unable to detect an intrusion by an unknown malware. On the other hand, anomaly-based methods model the normal behavior of the computer system and thus, if a deviation from this behavior is observed, the system will alert of an intrusion. Such methods are intended to detect unknown malwares; however, they may cause many false alarms, as there are many abnormal patterns which do not necessarily point at intrusions.

Most of the current techniques for detecting malwares, whether signature or anomaly based, rely on gathering information from certain components in the computer system. For example, some systems analyze executable files on local storage devices; others monitor the contents of packets which have been sent and/or received by the computer, and others monitor the system calls. Furthermore, there exist network based intrusion detection methods in which the network measurements are monitored. If such techniques were directed to more than a few information channels, they would require extremely heavy computational resources. However, monitoring only a few features is not necessarily sufficient and there may be many cases of intrusions that remain undetected, in addition to many false alarms, which, in certain cases, may be even more harmful.

It would therefore be highly desirable to develop a reliable method for detecting malicious behavioral patterns that are related to malware in computerized systems that is capable of monitoring the important features of the computer behavior, in a short time.

It is an object of the present invention to provide a method that is able to accurately assess information gathered from many channels of a computerized system that comprises data exchange channels, and to alert of malware intrusions, particularly intrusions of computer worms. Such a method would enable the disconnection of computers which were intruded by malwares from the network, thereby protecting other computers on the network which were not yet invaded.

It is another object of the present invention to provide a method, which can minimize the number of intrusions that remain undetected.

It is a further object of the present invention to provide such a method that minimizes the number of false alarms.

It is yet a further object of the present invention to provide a method that can detect new types of intrusions.

It is still a further object of the present invention to provide a method that is able to detect intrusions at a relatively high speed, thereby enabling a fast containment of that intrusion, before large portions of the network are infected.

It a further object of the present invention to provide an efficient method that does not require many computational resources.

Further purposes and advantages of this invention will become apparent as the description proceeds.

SUMMARY OF THE INVENTION

The present invention is directed to a method for detecting malicious behavioral patterns which are related to malicious software such as a computer worm in computerized systems that include data exchange channels with other systems over a data network. Accordingly, hardware and/or software parameters are determined in the computerized system that is can characterize known behavioral patterns thereof. Known malicious code samples are learned by a machine learning process, such as decision trees, Naïve Bayes, Bayesian Networks, and artificial neural networks, and the results of the machine learning process are analyzed in respect to the behavioral patterns of the computerized system. Then known and unknown malicious code samples are identified according to the results of the machine learning process.

Whenever the machine learning process is an artificial neural network, malicious behavioral patterns are detected by:
  determining hardware and/or software parameters in the computerized system that are capable of characterizing known behavioral patterns thereof;
  labeling input data samples with labels that correspond to the known behavioral patterns;
  performing supervised training of one or more ANNs according to data sets, for which the corresponding behavioral pattern is known;

feeding, into the trained ANNs, input data sets extracted from signals that correspond to the parameters;

analyzing the clusters formed from the binary output patterns of the hidden neurons of each trained ANN;

whenever a formed cluster does not correspond to the binary output pattern of a known behavioral pattern, alerting an expert system of that binary output pattern; and classifying the unknown binary output patterns as an intrusion or as a new non-malicious state, according the analysis of the unknown binary output pattern by the expert system.

Different input data sets may be generated by sampling the signals that correspond to parameters using different sampling frequencies, such that different parameters are analyzed by each ANN. The number of the input parameters may be reduced by repeating the training process, while each time, excluding the parameter(s) that do not contribute to the training process of the corresponding ANN(s).

The ANNs may be trained in near real time, so as to identify any new binary output patterns that at least one of the ANNs has reported to the expert system. Alternatively, the ANNs can be trained off-line, in a successive manner, so as to identify any new binary output patterns that at least one of the ANNs has reported to the expert system.

All the above and other characteristics and advantages of the invention will be further understood through the following illustrative and non-limitative description of preferred embodiments thereof.

DETAILED DESCRIPTION OF PREFERRED EMBODIMENTS

In view of the disadvantages of the known methods for protecting computerized systems from intrusions, particularly computer worms, there is a need for an improved method for performing such tasks in a better and more efficient manner.

The present invention relates to a system that employs the capabilities of machine learning techniques in order to detect malicious computer behavior patterns. Once malicious behavioral patterns are recognized on a computerized system, the system of the present invention alerts an expert system which may be either human or automatic. The expert system receives the suspicious behavioral pattern, analyzes it, and decides whether the computerized system has indeed been intruded by a malware, specifically, a computer worm.

In one embodiment of the present invention, an expert system which has come to the conclusion that a computerized system has been intruded by a computer worm can either disconnect the infected part of the system, or reinstall it through the network, so as to eliminate the propagation of the intruding computer worm.

As mentioned hereinabove, the present invention employs machine learning techniques in order to detect malicious behavioral patterns in computerized systems, thereby overcoming the drawbacks of the prior art. We shall refer herein to four different machine learning methods, namely, Decision Trees, Naïve Bayes, Bayesian Networks, and Artificial Neural Networks (ANN). However, as would be understood by those familiar with the art, the above four methods are non-limiting, and any suitable machine learning method could be implemented in the present invention.

While the focus of this invention is not on the above-mentioned machine learning algorithms themselves, but rather their applications, below is a short description of each of those machine learning methods for the sake of completeness.

Artificial Neural Networks:

An ANN is an information processing paradigm that is inspired by the way biological nervous systems, such as the brain, process information. The key element of this paradigm is the structure of the information processing system. It is composed of a large number of highly interconnected processing elements (neurons) working in unison to solve specific problems. ANNs, can be trained by examples. An ANN is configured for a specific application, such as pattern recognition or data classification, through a learning process.

Artificial neural networks, with their remarkable ability to derive meaning from complicated or imprecise data, can be used to extract patterns and detect trends that are too complex to be noticed by either humans or other computational techniques. A trained ANN can be considered to be an "expert" in the category of information that should be analyzed. The main advantages of ANNs are their high ability to find patterns in highly non-linear problems and their relatively fast evaluation time.

A typical ANN can be described as having three layers, i.e. input neurons, hidden neurons, and output neurons. Every input neuron is connected to all of the hidden neurons, and in turn, every hidden neuron is connected to all of the output neurons.

Decision Trees:

Decision tree learners are a well-established family of learning algorithms [see for example: Quinlan J. R., 1993, C4.5: programs for machine learning, Morgan Kaufman Publishers Inc., San Francisco, Calif., USA]. Initially proposed in the 1970s, these algorithms have been continuously developed to include more features and yield a better performance. Classifiers are represented as trees whose internal nodes are tests on individual features and whose leaves are classification decisions. Typically, a greedy heuristic search method is used to find a small decision tree that correctly classifies the training data. The decision tree is induced from the dataset by splitting the variables based on the expected information gain, based on Shannon's information measure; thus, the feature appearing at a higher level of the tree is more contributive than the ones in the bottom for the classification task. In order to handle noisy data, they are typically augmented with a "pruning" procedure that prevents overfitting of the training data. An important characteristic of Decision Trees is the explicit form of their knowledge which can be represented easily as rules. More information regarding Decision Trees can be found for example at http://en.wikipedia.org/wiki/Decision_tree.

Naïve Bayes:

The Naïve Bayes classifier is based on the Bayes theorem, which in the context of classification states, affirms that the posterior probability of a class is proportional to its prior probability as well as to the conditional likelihood of the features, given this class. If no independent assumptions are made, a Bayesian algorithm must estimate conditional probabilities for an exponential number of feature combinations. "Naive Bayes" simplifies this process by making the assumption that features are conditionally independent, given the class, and requires that only a linear number of parameters be estimated. The prior probability of each class and the probability of each feature, given each class, is easily estimated from the training data and used to determine the posterior probability of each class, given a set of features. Empirically, Naive Bayes has been shown to produce good classification accuracy across a variety of problem domains [see for example: Domingos P. and Pazzani M, 1997, On the optimality of simple Bayesian classifier under zero-one loss, Machine Learning, 29:103-130]. The simplicity of its implementation and its fast (linear) training time has made this algorithm a popular choice in practice. More information regarding Naïve Bayes methods can be found for example at http://en.wikipedia.org/wiki/Naive_bayes.

Bayesian Networks:

A Bayesian network or Bayesian belief network, or just belief network, is a form of the probabilistic graphical model [see for example: Pearl J., 1986, Fusion, propagation, and structuring in belief networks, Artificial Intelligence, 29(3): 241-288]. Specifically, a Bayesian network is a directed acyclic graph of nodes representing variables and arcs representing dependence relations among the variables. Like Naïve Bayes it is based on the Bayes Theorem, but unlike Naïve Bayes it does not assume that the variables are independent. Actually, Bayesian Networks are known for their ability to represent the conditional probabilities which are the relations between variables. The Bayesian Network represents the variables as nodes in an acyclic graph of nodes, and their relations, or dependencies, are represented by the arcs. An arc from one node to another means that the first node is the parent; thus each node is represented by a table which describes its conditional probabilities based on its parent's variables. This conditional distribution is known as the posterior distribution of the subset of the variables, given the evidence. The posterior gives a universal sufficient statistic for detection applications, when one wants to choose values for the variable subset which minimize some expected loss function, for instance the probability of decision error. A Bayesian network can thus be considered a mechanism for automatically constructing extensions of the Bayes Theorem to more complex problems. Bayesian networks were used for modeling knowledge and were implemented successfully in different domains. More information regarding Bayesian networks can be found for example at http://en.wikipedia.org/wiki/Bayesian_networks.

As mentioned above, the system of the present invention can implement any suitable machine learning method. One embodiment of the present invention implements an Artificial Neural Network technique.

ANNs are trained with proper data, so as to render them appropriate for the problem the user wishes to solve. In the present invention the problem to be solved is that of detecting malicious behavioral patterns in computerized systems, which ultimately allows the detection of intruding malware, particularly computer worms.

Figure 1:
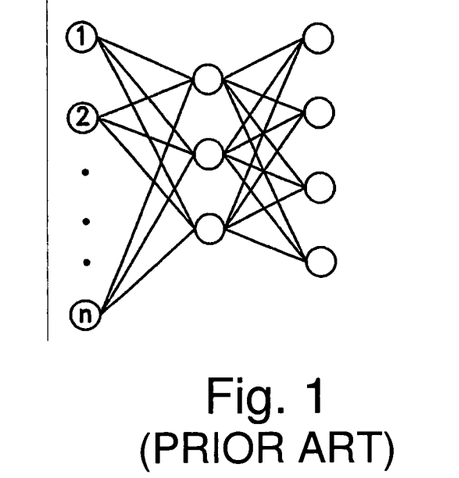
FIG. 1 shows the outline of a supervised ANN.
Figure 2:
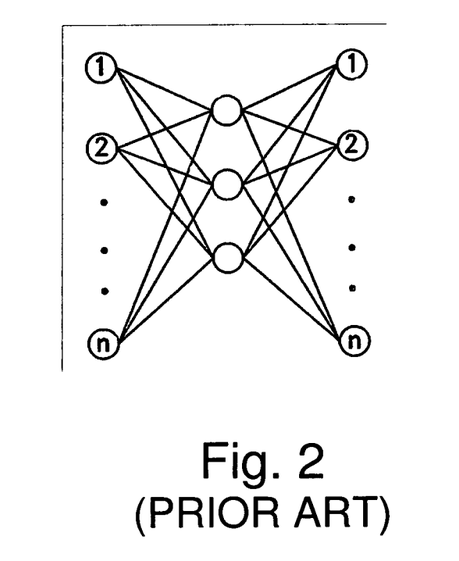
FIG. 2 shows the outline of an unsupervised ANN.

An ANN may be trained in a supervised or an unsupervised manner. In FIG. 1 the outline of a supervised ANN is shown, while FIG. 2 shows the outline of an unsupervised ANN. In both figures, the input layer is the rightmost layer, the hidden layer is in the middle, and the output layer is positioned on the left-hand side. The number of hidden neurons in both ANNs was chosen arbitrarily to be three.

Supervised training is possible when the classes of the output neurons are known. For example, as depicted in FIG. 1, if four types of computer worms are known, there will be four output neurons, one for each type. A certain percentage of the samples in the data set are used to train the ANN, i.e. they are forwarded to the ANN as input values, and in case that the output of a certain sample is incorrect, the weights of the neurons are changed by predetermined processes inside the ANN. Once this process is repeated an adequate number of times, the ANN is considered to be trained, and thus will output a minimal number of errors when encountering new samples from the data set. The number of the input parameters may be reduced by repeating the training process, while each time, excluding the parameter(s) that do not contribute to the supervised training process of the corresponding ANN(s). The reduction process is described, for example, in "Selection Of Quasi-Optimal Inputs In Chemometrics Modeling By Artificial Neural Network Analysis" (by Zvi Boger, Analytica Chimica Acta 490, March 2003, pp 31-40).

The disadvantage of the supervised ANNs known in the art is that they are generally incapable of identifying new patterns, i.e. types of samples that were not present in the training set. For example, a new type of worm would generally not be identifiable in a supervised system, since it does not match any of the output neurons. Such an instance would mostly be classified incorrectly.

On the other hand unsupervised ANNs are capable of detecting new patterns. Generally, unsupervised ANNs are implemented when the classes of the output neurons are unknown. Since these classes are unknown, the relevant information is derived from the hidden neurons, rather than the output neurons.

The hidden neurons' outputs condense the information in the feature space into a smaller space, orthogonal to the feature space, in order to generate the correct outputs of the ANN model. The information content of the hidden neurons' outputs reaches its maximal value when they are close to zero or unity, thereby minimizing the entropy. In many cases in a well-trained ANN, the hidden neurons' output values tend to be close to either zero or unity. Thus the hidden neurons' outputs may be rounded into binary patterns, giving a maximum of $2^h$ possible classes, wherein "h" is the number of hidden neurons.

Such "binary" patterns can be used successfully to form clusters in ANN applications. This type of clustering is also referred to as self-organization, in the sense that it self-organizes data presented to the ANN and detects their collective properties. Data set samples, for which the output patterns of the hidden neurons are identical, are assumed to belong to the same cluster.

As is illustrated in FIG. 2, the number of input and output neurons is identical in unsupervised ANNs, since the classes of the output neurons are unknown. When this number is high, the unsupervised ANNs require many computational resources, and thus, it may be more time consuming to implement unsupervised ANNs for intruder detection in computerized systems.

In order to be able to detect intrusions, including ones unknown to the ANN, in a reliable, yet fast, manner, the present invention provides a method, according to which the ANN is trained in a supervised manner, so as to be computationally inexpensive, though all on-line analysis is conducted using information gathered only from the hidden neurons, as done usually in unsupervised systems.

The configuration of the ANN used in the present invention is described in the following steps:
1. defining the classes of the output neurons;
2. analyzing all parameters that can represent a computerized system's behavior, including information received from internal data buses and information received from the operating system, to decide which channels of information are more important for detecting intrusions;
3. training the ANN in a supervised manner by choosing data samples that include signals received only from the important channels of information; and
4. testing the ANN with new data samples, while analyzing only the clusters formed by the hidden neurons.

According to one embodiment of the present invention, the assessment of the importance of the different alleys of information described in Step 2 hereinabove may be performed using an algorithm which analyzes the training process of the ANN and evaluates which data sample parameters have no, or very little, influence on the training process of the ANN. Such parameters are deleted from the data set, and the training of the ANN is then repeated with a smaller number of input neurons. This procedure is repeated until the number of input neurons is minimized.

Once the ANN is configured as described hereinabove, it is able to detect intrusions into the computerized system, caused specifically by computer worms.

In one embodiment of the present invention, the ANNs may be trained almost in real time to recognize new patterns that did not exist in the initial training set. Alternatively, in another embodiment of the present invention, the ANNs may be trained offline, in a successive manner, so as to minimize the interruption of their analysis of the gathered information. Such training minimizes the number of false alarms reported to the expert system, described hereinabove, thereby enhancing the capabilities of the method of the present invention.

When detecting malware in a computerized system, not only many features of the system should be analyzed, but also the sampling frequency of those features is important. There may be malwares which remain undetected if the sampling frequency is too high. However, if it is too slow, other malwares may be missed. Therefore, according to one embodiment of the present invention, it is possible to simultaneously use two or more of the ANNs described hereinabove, while each ANN receives input samples, gathered from all channels of information at several different sampling frequencies.

In another embodiment of the present invention, different ANNs analyze parameters received from different channels of information, while each group of parameters is sampled at an appropriate frequency. Any combination of any number of ANNs, sampling parameters of behavior of the computerized system at any frequency, is considered to be a part of the present invention.

Furthermore, in another embodiment of the present invention it is possible to simultaneously implement several different types of machine learning algorithms. This too may aid in better detection of various types of computer worms which intrude the computerized system.

If any one of the machine learning algorithms working in the system detects any suspicious patterns it alerts the expert system, as described hereinabove, of the suspicious pattern.

The invention will be further illustrated with reference to the following illustrative example, which is not intended to limit the scope of the invention in any manner.

EXAMPLE 1

The method of the present invention was tested in worm detection on a personal computer connected to a simulated internet system and comprising a Microsoft Windows® XP operating system.

In order to train the ANN, the Levenberg-Marquardt method, which is considered to be one of the preferable algorithms for training ANNs, was used. The Levenberg-Marquardt (LM) algorithm used is the one available as part of the MATLAB® Neural Network Tool-box. The LM method uses second-order derivatives, and therefore may require high computation resources. However, since the training process is performed off-line, the modern high-speed PC computing power was sufficient for this purpose. Once trained, the ANN processing capabilities are very fast and are suitable for real-time computer threat detection.

The following worms were used to "attack" the PC being analyzed:
1. W32.Deborm.Y (DebormY)

This worm scans the local network and tries to propagate along its data channels. It attempts to a share C$ (C drive) using the accounts of the administrator, owner or guest. As a result, if a certain account does not have a password, the connection will be established.

2. W32.HLLW.Doomjuice.B (DoomJuiceB)

This worm randomly generates IP addresses and attempts to propagate to a computer by using the backdoor opened by the worm W32.Mydoom.A@mm. It tries to connect to the computer using TCP port 3127, and if the connection is established, it uses the backdoor component to send itself.

Further, this worm is programmed to add itself to the registry so that it loads during startup. Additionally it is programmed to launch a DoS (Denial of Service) attack against www.microsoft.com using port 80.

3. W32.Korgo.X (PadobotKorgoX)

This worm generates random IP addresses and exploits the LSASS Buffer overrun vulnerability using TCP port 445. If it succeeds to takeover a computer, the newly infected computer will send a request for downloading the worm from the infected computer by using a random TCP port. Further, this worm is programmed to load itself during Window's startup by changing the registry, and it tries to inject itself into the Explorer so that it will work as a thread of it.

4. W32.HLLW.Raleka (Raleka.H)

This worm launches 200 threads which generate random IP addresses. The random IP addresses are chosen so that some of them are similar to the current IP and the others are totally random. The similar IP addresses are more likely to be in the same network topology as the current IP address. The worm takes over the computer by exploiting the Microsoft DCOM RPC vulnerability, and attempting to download files from a predefined location. After that, it launches a thread that tries to connect to IRC servers using port 6667, and if a connection is made it joins a chat channel and submits the computer's IP. The worm then opens a random TCP port above 32767 for remote connections and may also get commands from the chat site.

5. W32.Sasser.D (Sasser.C)

This worm spreads by generating random IP addresses using 128 threads. The IP addresses are generated so that 48% of them should be close to the current computer by using the current computer's IP and 52% of them are generated completely randomly. The worm connects to the remote computer using TCP port 445 and if the connection succeeds, a remote shell is opened. The remote shell is used to connect to the infected computer's FTP server and to transfer the worm to other computers.

6. Daber.A (Daber.A)

This worm scans networks for random IP addresses, searching for victim machines that have the ftp component of the Sasser worm installed on port 5554. When the worm finds a suitable victim machine, it sends a vulnerability exploit to it in order to infect the system. The worm then launches the command shell on port 8967 and installs a backdoor on port 9898 to receive external commands.

7. Slackor.A (Slackor.A)

When the Slackor worm is run, it sends a SYN TCP packet to generated IP addresses through port 445 to search for the systems using Server Message Block (SMB). It then attempts to connect to the Windows default shares on those systems by using the username and password pair that it carries. If successful, it tries to copy the worm to the system.

Each worm was executed separately on the "clean" computer for a specified amount of time. During this time, various features were gathered from the computer. The purpose of those features was to represent the behavior of a computer, infected with a certain worm. Conceptually, the reason to choose this specified subset was, on the one hand, to combine most of the possible measures related to networking, and on the other hand, to combine measures that may provide a general observation about the processes and threads currently running on the computer. All other measures, such as graphics related features etc., seemed to be totally irrelevant. It is possible to divide all chosen features conceptually into six general subgroups:

1. Processor features,
2. TCP layer features,
3. UDP layer features,
4. IP layer features,
5. Low Network Interface features, and
6. Objects features.

Following is the full list of 68 features that were sampled so as to represent the computer behavior:

1. IP\Datagrams Forwarded/sec
2. IP\Datagrams Outbound Discarded
3. IP\Datagrams Outbound No Route
4. IP\Datagrams Received Address Errors
5. IP\Datagrams Received Delivered/sec
6. IP\Datagrams Received Discarded
7. IP\Datagrams Received Header Errors
8. IP\Datagrams Received Unknown Protocol
9. IP\Datagrams Received/sec
10. IP\Datagrams Sent/sec
11. IP\Datagrams/sec
12. IP\Fragment Re-assembly Failures
13. IP\Fragmentation Failures
14. IP\Fragmented Datagrams/sec
15. IP\Fragments Created/sec
16. IP\Fragments Re-assembled/sec
17. IP\Fragments Received/sec
18. Network Interface\Bytes Received/sec
19. Network Interface\Bytes Sent/sec
20. Network Interface\Bytes Total/sec
21. Network Interface\Current Bandwidth
22. Network Interface\Output Queue Length
23. Network Interface\Packets Outbound Discarded
24. Network Interface\Packets Outbound Errors
25. Network Interface\Packets Received Discarded
26. Network Interface\Packets Received Errors
27. Network Interface\Packets Received Non-Unicast/sec
28. Network Interface\Packets Received Unicast/sec
29. Network Interface\Packets Received Unknown
30. Network Interface\Packets Received/sec
31. Network Interface\Packets Sent Non-Unicast/sec
32. Network Interface\Packets Sent Unicast/sec
33. Network Interface\Packets Sent/sec
34. Network Interface\Packets/sec
35. Objects\Events
36. Objects\Mutexes
37. Objects\Processes
38. Objects\Sections
39. Objects\Semaphores
40. Objects\Threads
41. Process(_Total)\Thread Count
42. Processor(_Total)\% C1 Time
43. Processor(_Total)\% C2 Time
44. Processor(_Total)\% C3 Time
45. Processor(_Total)\% DPC Time
46. Processor(_Total)\% Idle Time
47. Processor(_Total)\% Interrupt Time
48. Processor(_Total)\% Privileged Time
49. Processor(_Total)\% Processor Time
50. Processor(_Total)\% User Time
51. Processor(_Total)\Interrupts/sec
52. System\System Calls/sec
53. System\Threads
54. TCP\Connection Failures
55. TCP\Connections Active
56. TCP\Connections Established
57. TCP\Connections Passive
58. TCP\Connections Reset
59. TCP\Segments Received/sec
60. TCP\Segments Retransmitted/sec
61. TCP\Segments Sent/sec
62. TCP\Segments/sec
63. Thread(_Total/_Total)\Context Switches/sec
64. UDP\Datagrams No Port/sec
65. UDP\Datagrams Received Errors
66. UDP\Datagrams Received/sec
67. UDP\Datagrams Sent/sec
68. UDP\Datagrams/sec In addition to the infected cases, the same features were sampled on an absolutely "clean" computer, which is referred to herein as a virtual worm with name "Clean".

The Microsoft's Performance tool was used in order to gather the data. This tool allows the gathering of any number of parameters from a long list of available parameters with different resolution times. The gathered data was stored in Comma-Separated-Values files.

There were two data-gathering processes consisting of six different sub-processes. In each such sub-process one worm (from the six available, including the "Clean" one) was executed for a constant time period during which the behavior of the computer was recorded with a specified resolution. That is, all 68 features were measured at each specified time. Each row (referred to herein as "sample") in the Comma-Separated-Values files, which represent the behavior of the computer in the specified time slice, was labeled with the name of the worm executed on the computer.

The first data gathering process continued for about seven hours for each worm, while there was no user activity during the data gathering process, in order to properly analyze the system. As would be understood by those familiar with the art, 7 hours is an extremely long period of time when relating to worm propagation, thus only a small portion of the gathered data was used for the calculations. The second data gathering process was shorter in time (about twenty minutes for each worm), but included intensive user activity during the data gathering process. Here too, only a portion of the data was used in the calculations. The schedule of the user activity during the second data gathering process is described in Table I.

TABLE I

| Time period | User operations |
|---|---|
| 0-5 minutes | Opening 10 MS Word instances<br>Downloading two files simultaneously |
| 5-10 minutes | Opening 5 instances of MS Excel<br>Generating random numbers in MS Excel<br>Downloading one file<br>Listening to internet radio |
| 10-15 minutes | Opening 12 instances of MS Word<br>Downloading one file |
| 15-20 minutes | Opening 9 instances of MS Excel<br>Generating random numbers in MS Excel<br>Browsing the internet (using MS IE) |

For each time slice all the activities were performed simultaneously.

The exact specifications of two data sets, the first gathered without user activity, and the second gathered with heavy user activity, is presented in Table II. As described, the resolution and total execution time were common and constant for all sub-processes.

TABLE II

| Specification | Data Set 1 (DS1) | Data Set 2 (DS2) |
|---|---|---|
| Resolution of all sub-processes | 1 second | 1 second |
| Execution time of each sub-process | 7 hours | 20 minutes |
| Worms used | 1-5 | 1, 3, 5-7 |
| Number of features | 68 + 6 class attributes | 68 + 6 class attributes |
| Total number of samples | 150789 | 9371 |
| Training set percentage | 1% | 10% |
| Training samples | 1508 | 938 |
| Test set percentage | 99% | 90% |
| Test samples | 149281 | 8433 |
| User activity | No | Yes |

Due to the unusually large amount of samples available, the test percentage of the two test sets was chosen to be 99% and 90% (and not 30% as usual) in order to check the ability of the ANN to generalize.

In order to check the ability of the ANN to generalize even further, one additional test was performed for each data set. During this test the samples of one of the worms were transferred completely from the training data set to the test data set, i.e., the training set did not contain any samples related to a certain worm. The references to those two additional data sets here in below are Data Set 1.1(DS1.1) and Data Set 2.1 (DS1.2), respectively to Data Set 1 and Data Set 2. After training the ANN with the remaining samples in the training set, the accuracy of the prediction was measured using the hidden-neurons-based clustering method, described hereinabove.

In the supervised training phase of the ANN, it was necessary to compare the accuracy of the different algorithms of the ANN. Moreover, it was required to learn whether there were any activities that were easier to learn and detect than the others, as well as to learn which algorithm is superior in learning and detecting specific activities. In order to perform these comparisons, a few commonly used evaluation measures were implemented: True Positive (TP), False Positive (FP), Precision, F-Measure and Accuracy. In addition, we used ROC curves to demonstrate the tradeoff between the TP and FP measures. Table III shows the basic evaluation measures. The letter 'A' after each measure stands for "amount" and emphasizes the fact that those measures are not fractions but true amounts.

TABLE III

| | | Actual (True) Diagnosis | |
|---|---|---|---|
| | | Positive | Negative |
| Algorithm prediction | Positive | TPA | FPA |
| | Negative | FNA | TNA |

1. True Positive (TP) value shows how many of the positive samples were actually labeled as positive.

$$TP = TPA/(TPA+FNA) \quad (1)$$

2. False Positive (FP) value shows how many of the negative samples were actually labeled as positive.

$$FP = FPA/(FPA+TNA) \quad (2)$$

3. Precision $$presicion = TPA/(TPA+FPA) \quad (3)$$

4. F-Measure $$F\text{measure} = 2 \times (TP \times presicion)/(TP + presicion) \quad (4)$$

5. Accuracy $$\text{accuracy} = (TPA+TNA)/(TPA+TNA+FPA+FNA) \quad (5)$$

The activation function used in the hidden neurons was a logistic sigmoid, whose values range from 0 to 1, so by rounding off the output of the hidden neurons, a binary pattern was obtained. This was done for each sample that propagated through the trained ANN. After training the supervised ANN, it was tested with unknown samples.

After the propagation of all of the samples in the data set, each sample produced a binary pattern that represented the cluster the sample belongs to. This enabled the construction of a table that represented the obtained clusters. Each row in that table represented a cluster; the first cell in the row represented the cluster size, i.e., the amount of samples in this cluster, and the following rows represented the ratio of samples which belong to a certain class (e.g., "Worm 1" or "Clean"). If the majority of samples of a certain cluster were of class X then the cluster as a whole was considered to be of type X. The samples from classes other than X in that cluster are considered to be incorrectly classified samples. Thus, the accuracies for each one of the classes were calculated using equation (6). In (6) M is the clusters table, l is the class index whose accuracy we want to calculate and $\sigma(i)$ is the i's index (of k total) of the cluster where class l is dominant.

$$\text{Accuracy}(l) = \sum_{i=1}^{k} M_{\sigma(i),l} + \sum_{i=\{[1...n]/\sigma\}} \sum_{j=\{1...l-1,l+1...n\}} M_{i,j} \Bigg/ \sum_{i=1}^{n} \sum_{j=1}^{n} M_{i,j} \quad (6)$$

In Tables IV (no user activity) and V (with user activity) the false negative (1-TP) and Accuracy results for supervised analysis using the ANN method of the present invention are presented for each class. The average accuracies achieved for this method were 99.96% and 99.79%, respectively. For clarity, (1-TP) and (1-Accuracy) values are presented in percents.

TABLE IV

NO USER ACTIVITY, RESULTS SUMMARY

| 1 - TP | 1- Accuracy | Class |
|---|---|---|
| 0.00% | 0.02% | Deborm.Y |
| 0.00% | 0.00% | DoomJuice.B |
| 0.08% | 0.01% | Padobot.KorgoX |
| 0.08% | 0.03% | Raleka.H |
| 0.10% | 0.02% | Sasser.C |
| 0.01% | 0.01% | Clean |

TABLE V

WITH USER ACTIVITY, RESULTS SUMMARY

| 1 - TP | 1- Accuracy | Class |
|---|---|---|
| 0.99% | 0.31% | Clean |
| 0.79% | 0.16% | Daber.A |
| 0.39% | 0.15% | Deborm.Y |
| 0.32% | 0.05% | Padobot.KorgoX |
| 0.71% | 0.39% | Sasser.C |
| 0.58% | 0.19% | Slackor.A |

It is clear that generally, the results are accurate.

The clustering evaluation was then used in order to determine the quality of detection. Table VI presents the summary of such AN evaluation technique on all four data sets. For clarity, the (1-Accuracy) values are given in percents. Values labeled bold stand for worms that were missing in the datasets.

TABLE VI

CLUSTERING EVALUATION OF THE DATA SETS

| DS1 | DS2 | DS1.1 | DS2.1 | Class |
|---|---|---|---|---|
| 0.02% | 0.11% | 2.19% | 11.34% | Deborm.Y |
| 0.00% | — | 1.56% | — | DoomJuice.B |
| 0.00% | 0.15% | 0.15% | 1.49% | Padobot.KorgoX |
| 0.02% | — | 0.96% | — | Raleka.H |
| 0.01% | 0.28% | 1.12% | 1.55% | Sasser.C |
| 0.01% | 0.85% | 0.40% | 0.50% | Clean |
| — | 0.02% | — | 1.44% | Daber.A |
| — | 0.64% | — | 10.24% | Slackor.A |

As seen in Table VI, the missing worms were not classified in the clean class, nor were they classified in any of the existing worm classes. The binary patterns of the hidden neurons created a new class for each new worm, verifying that any unknown pattern will not remain unnoticed.

In malware detection in general, and in worms detection in particular, the false positive parameter relative to the "Clean" state is very important. Such false negatives are those instances when a worm was detected as clean case, which are usually the worst mistake the detection system may make. Table VII presents the false negatives values for clustering evaluation of each of the datasets which, as can be seen, are very low even in DS1.1 and DS2.1 where there was a worm missing from the training set.

TABLE VII

FALSE NEGATIVES VALUES FOR EACH DATA SET

| DS1 | DS2 | DS1.1 | DS2.1 |
|---|---|---|---|
| 0.01% | 0.39% | 0.35% | 0.26% |

It can be seen from the above example, that it is possible to detect the intrusion of known, and furthermore, of unknown worms by analyzing the binary pattern of the hidden neurons of a supervised trained ANN.

EXAMPLE 2

In this example, the following four classification algorithms were implemented:

Decision trees: J48, the Weka version of the commonly used C4.5 algorithm [Quinlan J. R., 1993, C4.5: programs for machine learning, Morgan Kaufman Publishers Inc., San Francisco, Calif., USA]. Various studies in the past have shown that it is an efficient algorithm that learns accurate classifiers in many domains.

Naïve Bayes The Naive Bayes, the standard version that comes with Weka.

Bayesian networks: The Bayesian Network standard version which comes with WEKA.

Artificial Neural Networks: All of the ANN manipulations were performed within a MATIAB® environment using the Neural Network Toolbox (see Demuth H. and Beale, 1998, M. Neural Network Toolbox for use with Matlab, The Mathworks Inc., Natick, Mass., USA)

The method of the present invention was tested in worm detection by monitoring system calls, as well as computer measurements extracted from the windows performance tool, which will be described hereinbelow.

In order to create the datasets, a local lab network of computers was constructed. This local network was isolated from the real internet network but enabled to represent a real internet network environment from the point of view of a single computer. This setup enabled the injection of worms into a controlled environment, while monitoring the computer measurements, which were saved in log files. Preliminary results were very encouraging, but an obvious question arose: is a classifier trained on data from a computer having certain hardware configuration and certain specific background activity able to classify correctly the behavior of a computer having other configurations? Thus, a wider experiment was designed, in which eight datasets were created. These eight datasets resulted from three binary properties: two computers, having different configurations, background applications, and user activities. Another goal was to select the minimal subset of features using a feature selection technique. Finally, four classification algorithms were applied on the given datasets in a variety of experiments.

Environment Description

The lab network consisted of seven computers, which contained heterogenic hardware, and a server computer simulating the internet. The windows performance counters were used (see http://msdn.microsoft.com/library/default.asp?url=/library/en-us/counter/counters2_lbfc.asp), enabling the monitoring of system features that appear in the following main categories (the amount of features in each category appear in parenthesis): Internet Control Message Protocol (27), Internet Protocol (17), Memory (29), Network Interface (17), Physical Disk (21), Process (27), Processor (15), System (17), Transport Control Protocol (9), Thread (12), User Datagram Protocol (5). In addition, the VTrace tool [Lorch, J. and Smith, A. J. (2000) The VTrace tool: building a system tracer for Windows NT and Windows 2000. MSDN Magazine, 15(10):86-102, October 2000] was used. VTrace is a software tool which can be installed on a PC running Windows for monitoring purposes. VTrace collects traces of the file system, the network, the disk drive, processes, threads, interprocess communication, waitable objects, cursor changes, windows, and the keyboard. The data from the windows performance was configured to measure the features every second and store them in a log file as vector. VTrace stored time-stamped events, which were aggregated into the same fixed intervals, and merged with the windows performance log files. These eventually included a vector of 323 features for every second.

Injected Worms

Five worms were used: W32.Dabber.A, W32.Deborm.Y, W32.Korgo.X, W32.Sasser.D, W32.Slackor.A. All of the worms perform port scanning having different characteristics. A short description of these worms can be found in Example 1 herein. In addition, further information regarding the above worms can be accessed through libraries on the web. See for example: Symantec—www.symantec.com, Kasparsky—www.viruslist.com, and McAfee—http://vil.nai.com.

Dataset Description

In order to assess the influence of a computer hardware configuration, background running applications, and user activity, three major aspects were considered: computer hardware configuration, constant background application consuming extreme computational resources, and user activity. Each aspect had two options: (1) Computer hardware configuration: an "old", having Pentium 3 800 Mhz cpu, bus speed 133 Mhz and memory 512 Mb, and a "new", having Pentium 4 3 Ghz cpu, bus speed 800 Mhz and memory 1 Gb. Both computers ran on Windows XP, since we considered it to be the most used operation system. (2) Background application—simulated by running the WEKA software [Witten I. and Frank E., 1999, Data Mining: Practical Machine Learning Tools. and Technique with Java Implementations, Morgan Kaufman Pub., San Francisco] which mainly affected the following features: Processor object, Processor Time (usage of 100%); Processor object, Page Faults/sec; and Physical Disk object, Avg Disk Bytes/Transfer, Avg Disk Bytes/Write, Disk Writes/sec. The two options were presence or absence of the application. (3) User activity: A user opened several applications, including Internet Explorer, Word, Excel MSN messenger, and Windows Media Player in a scheduled order. The two options were presence or absence of the user activity.

Finally, there were three binary aspects, which resulted in 8 combinations representing a variety of dynamic computer situations. Each dataset contained monitored samples of each one of the five worms injected separately, and samples of a normal computer's behavior without any injected worm. Each sample (record) was labeled with the relevant worm (class). The "clean" samples, with no worms, were labeled 'none'.

Feature Selection

In machine learning applications, the large number of features in a lot of domains presents a significant problem. Typically, some of the features do not contribute to the accuracy of the classification task and may even decrease it. Moreover, reducing the amount of features, while maintaining a high level of detection accuracy, is crucial for several computer performance and resource consumption aspects. Ideally, it would be preferable to have no consumption of computer resources resulting from the monitoring operation of the computer resources (measurements), as well as in the classifier operation. In order to reduce the amount of required features, a feature selection technique, commonly used in data mining, was implemented. In order to compare the performance of the classification algorithms, a filters approach, which is applied on the dataset and is independent of any classification algorithm, was used. In filters, a measure is used which quantifies the correlation of each feature to the class (in the present case, the presence or absence of worm activity). Each feature receives a rank representing its expected contribution in the classification task. Eventually, the top ranked features are selected.

Three feature selection measures, which resulted in a list of ranks for each feature and an ensemble of all the three, were used. Specifically implemented were Chi-Square (CS), Gain Ratio (GR), ReliefF and their ensemble. An explanation for those feature selection methods can be found, for example, in Witten, I. H. and Frank E., Data Mining: Practical machine learning tools and techniques, 2nd Edition, Morgan Kaufmann, San Francisco, 2005.

The top 5, 10, 20 and 30 features from the ranked lists, which resulted from each feature selection measure, were selected. Eventually this resulted in four features subsets of sets of datasets (each includes eight datasets, having a different subset of features), for each one of the four feature selection measures and the full set, which resulted in 17 datasets.

Classification Processes

In order to identify the classification process, which provides the highest level of accuracy, four commonly used machine learning processes were employed: Decision Trees, Naïve Bayes, Bayesian Networks and Artificial Neural Networks, in a supervised learning approach. Supervised learning, described at length hereinabove, includes two phases: the first phase, in which the classification algorithm learns from a provided training set, containing labeled examples, and the second phase in which it classifies the instances given in a testing set. In the testing phase the outputs of the classification algorithm are compared to the actual classes, as they appear in the testing set, represented in an accuracy measure.

Tests

The method of the present invention was tested to see whether it is possible to classify worm activity in a computer using a classifier trained on a data set collected from another computer configuration or background application. Using the variety of eight datasets it was shown that there is no significant difference when learning from specific examples over the others (within the eight datasets) [R Moskovitch, I Gus, S Plunderman, D Stopel, C Feher, Yisrael Parmet, Yuval Shahar, Host Based Intrusion Detection using Machine Learning, Submitted to ISI2007]. In this study the best feature selection measure, the best classification algorithm and the optimal features required to maintain a high level of accuracy were measured. In the ability of the method of the present invention to classify unknown worms using a training set of known worms was also tested.

Experimental Plan

In order to perform the two tests referred to above, the eight datasets described earlier were created. Out of the four feature selection measures, four subsets of each of the following features were extracted: Top 5, 10, 20 and 30, as well as the full features set, represented by 17 sets of (eight) datasets for the evaluation. After evaluating all the classification algorithms on the sets of datasets, the best feature selection and the top selection to evaluate the unknown worms' detection were selected.

Experiment 1

To determine which feature selection measure, top feature selection and classification algorithm are the best, a wide set of experiments were performed, in which each classification algorithm, feature selection and top selection combination was evaluated. Each classifier was trained on a single dataset i and tested on a single dataset j, where i and j are indices referring to a dataset out of the eight datasets. Thus, obtained was a set of 8 iterations in which a dataset was used for training, and 8 corresponding evaluations which were done on each one of the datasets, resulting in 64 evaluation runs. When i=j, 10 cross validation was used, in which the dataset was partitioned into 10 partitions and the classifier trained repeatedly on 9 partitions and tested on the 10th. In this test the task was to classify specifically the exact worm out of the five and the none activity and not just generally a worm and none behavior. Hereinbelow we shall refer to this experiment as $e_1$.

Experiment 2

In order to estimate the potential of the suggested approach in classifying an unknown worm activity, which was the main objective of this study, a different experiment was designed, in which the classifiers were trained based on part of the worms and tested on the excluded worms and the 'none' activity. In this experiment the algorithms were trained only on the dataset, within the eight, and the subset of features that had shown the best results in Experiment $e_1$.

In Experiment 2, referred to herein as $e_2$, the training set and the test set included the entire eight datasets, but in each iteration the training set included part of the worms and the test set included the excluded worms and the none activity in order to measure the detection capability of an unknown worm and the none activity. In the first part of this experiment, referred to herein as $e_{21}$, the training set consisted on four worms and the test set contained the excluded worm. The 'none' activity appeared in both datasets. This process was repeated five times for each worm.

The second experiment was an extension to $e_{21}$, referred herein as $e_{22}$, in which the amount of worms in the training set was decreased and the amount of worms in the test set was increased. This was done for a single worm and up to four worms in the training set. The test included only the excluded worms and didn't include the worms presented in the training set under the assumption that it would increase the accuracy. $e_{22}$ was performed in order to measure the performance as more worms are added to the training set.

Note, that in experiments $e_{21}$ and $e_{22}$, unlike in $e_1$, in which each worm class was defined and classified separately, the training sets had two classes: (generally) worm and none activity. Experiments $e_{21}$ and $e_{22}$ were evaluated on each classification algorithm, using the top feature selection that outperformed in $e_1$.

Evaluation Measures

For the evaluation the True Positive (TP) measure—the number of positive instances classified correctly as shown in Equation 1 (see Example 1), False Positive (FP)—the number of positive instances misclassified (Equation 2—see Example 1), and the Total Accuracy—the number of the absolutely correctly classified instances, either positive or negative, divided by the entire number of instances (Equation 3—see Example 1) were used.

Also, measured was the confusion matrix, which shows how many instances from each class were classified in each one of the classes (ideally all the instances would be in their actual class). The primitive evaluation measures used to define the evaluation measures are presented in Table III (see Example 1).

Results

Experiment I

As mentioned hereinabove, the objective in $e_1$ was to determine the best feature selection measure, top selection features and classification algorithms. Running 68 (4 classification algorithms applied to 17 data sets) evaluations (each includes 64 runs), which summed at 4352 evaluation runs.

Figure 3:
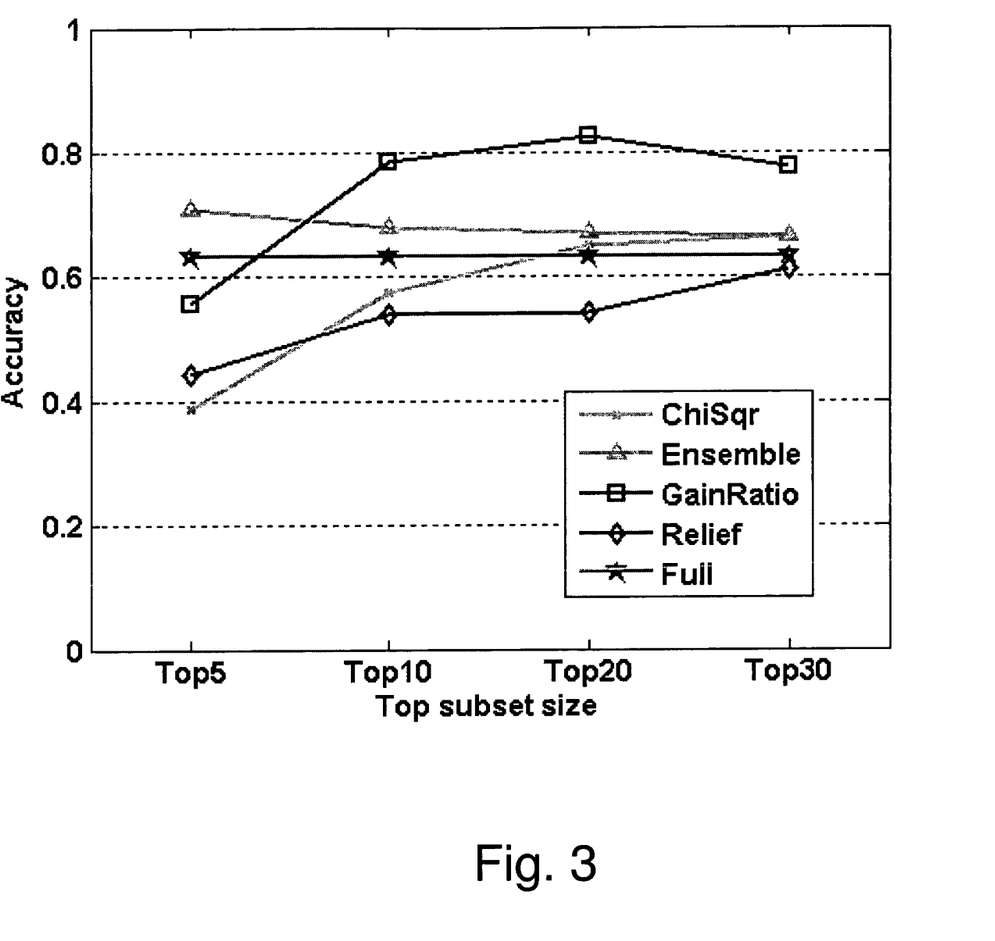
FIG. 3 schematically illustrates the results averaged according to the feature selection measures and the top selection, according to a preferred embodiment of the invention.

FIG. 3 illustrates the results averaged according to the feature selection measures and the top selection. Based on the mean performance of the four classification algorithms Gain-Ratio outperformed the other measures in most of the top features selection, while the Top5 outperformed with the ensemble. Unlike the independent measures in which there was a monotonic growth when features were added, in the ensemble a monotonic slight decrease was observed as more features were used. The Top20 features outperformed in average (of the feature selection measures) and in GainRatio in particular.

Figure 4:
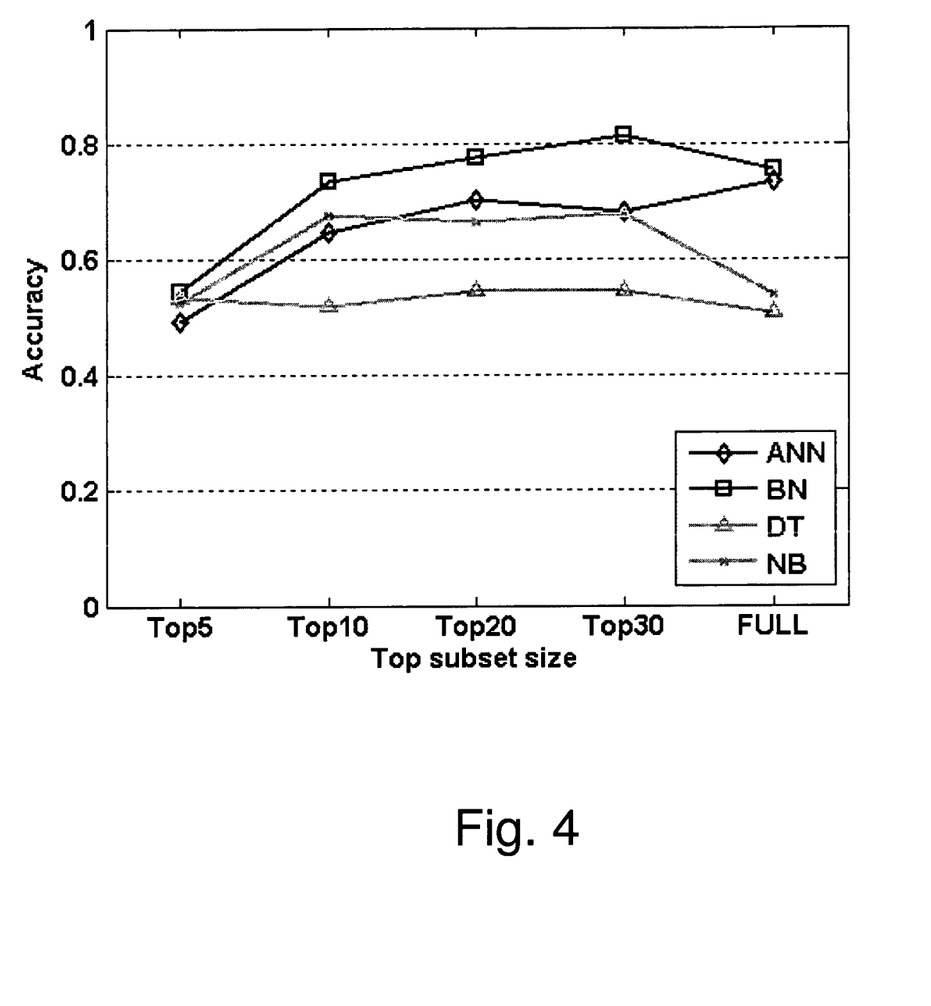
FIG. 4 schematically illustrates the results averaged according to the classification algorithms and the top feature selection.

FIG. 4 illustrates the results averaged according to the classification algorithms and the top feature selection. As can be seen therein, Bayesian Networks outperforms the other classification algorithms. In average (of all of the classification algorithms) the Top20 outperformed the other top feature selections measures.

Experiment II

Based on the results achieved in $e_1$, in which the Top20 from GainRatio outperformed only this subset was used in $e_2$. Table VIII presents a detailed report on the results from $e_{21}$. Each row presents the results achieved when worm i was in the test set and the columns refer to the classification algorithms. In average, while the Decision Trees outperformed the other classification algorithms, each classification algorithm outperformed in detecting different unknown worms and the false positive rates in all of the classification algorithms were low.

Figure 5:
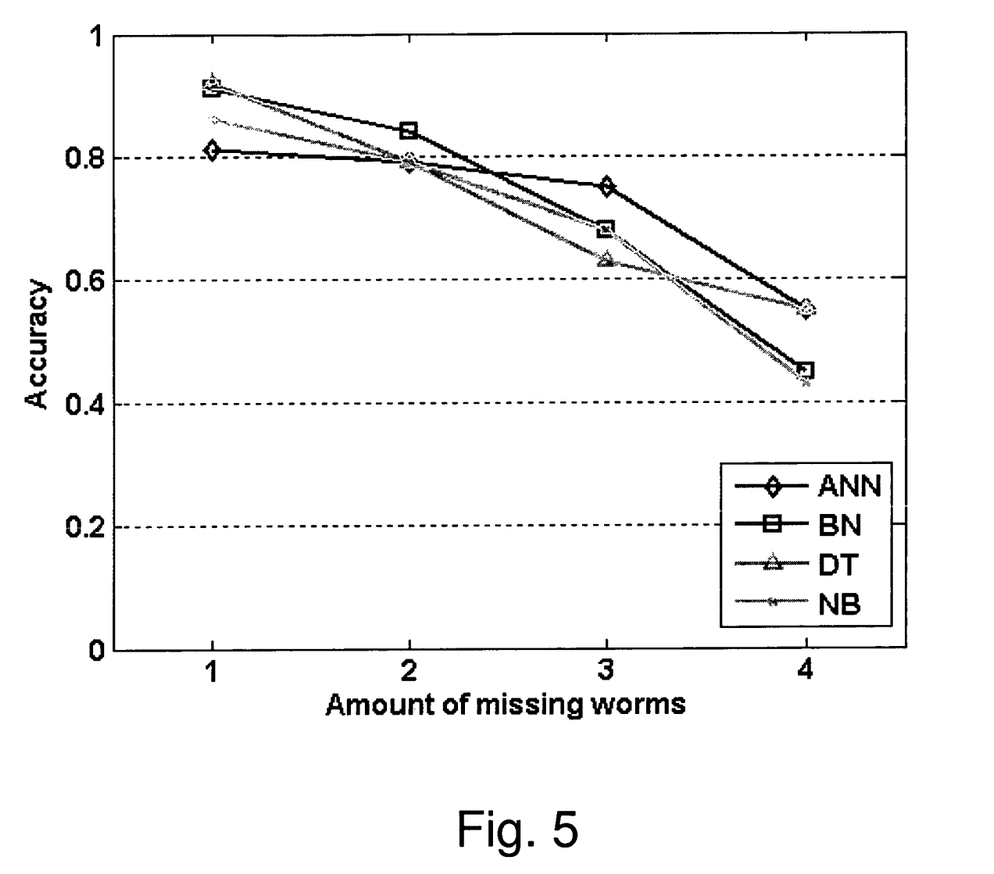
FIG. 5 presents the results of experiment $e_{22}$, according to a preferred embodiment of the invention.

FIG. 5 presents the results of $e_{22}$, in which a monotonic increase in the accuracy is shown. As more worms are in the training set the accuracy is higher.

CONCLUSIONS

From the results of the experiments reported in this example it is apparent that by using machine learning concepts, such as feature selection and classification algorithms it is possible to identify the most important computer features to detect worm activity. Experiment $e_1$ shows that the GainRatio feature selection measure was most suitable for the task of worm detection. In average, the Top20 features brought the highest results. The Bayesian Networks commonly outperformed the other classification algorithms. In the detection of unknown worms the results show that it is possible to achieve a high level of accuracy (90%), however, the detection of each worm varied, and each classification algorithm seemed to classify better other unknown worms. Therefore, it is considered a part of the present invention to apply an ensemble of classifiers to achieve unified detection accuracy of any worm.

Although embodiments of the invention have been described by way of illustration, it will be understood that the invention may be carried out with many variations, modifications, and adaptations, without departing from its spirit or exceeding the scope of the claims.

The invention claimed is:

1. A method for detecting malicious behavioral patterns which are related to malicious software in computerized systems that include data exchange channels with other systems over a data network comprising:
   (a) determining a set of parameters comprising at least one hardware parameter and at least one software parameter in said computerized system,
   wherein that at least one hardware parameter is selected from a group consisting of processor features and Network Interface features,
   wherein the at least one software parameter is selected from a group consisting of TCP layer features, UDP layer features and IP layer features;
   wherein the set of parameters is capable of characterizing known behavioral patterns of the computerized system;

(b) performing a first machine learning process and a second machine learning process on the determined set of parameter caused by known malicious code samples, wherein the first machine learning process is provided with input samples of the set of parameters gathered at a first sampling frequency and wherein the second machine learning process is provided with input samples of the set of parameters gathered at a second sampling frequency;

(c) analyzing the results of the first machine learning process and the second machine learning process in respect to the behavioral patterns of said computerized system; and (d) identifying known and unknown malicious code samples according to the behavioral patterns, which behavioral patters are the results of said first machine learning process and the second machine learning process, wherein the behavioral patterns represent the behavior of the computerized system.

2. The method of claim 1, wherein the malicious software is a computer worm.

* * * * *